(12) United States Patent
Semerly et al.

(10) Patent No.: US 12,544,603 B2
(45) Date of Patent: Feb. 10, 2026

(54) FILTER CONTAINING PHARMACEUTICAL SALT FOR A FACE MASK, BREATHABLE FACE MASK CONTAINING THE FILTER, AND METHOD OF MANUFACTURING

(71) Applicants: Lisa Semerly, Okemos, MI (US); Jacqueline Semerly, Okemos, MI (US)

(72) Inventors: Lisa Semerly, Okemos, MI (US); Jacqueline Semerly, Okemos, MI (US)

( * ) Notice: Subject to any disclaimer, the term of this patent is extended or adjusted under 35 U.S.C. 154(b) by 1275 days.

(21) Appl. No.: 17/213,801

(22) Filed: Mar. 26, 2021

(65) Prior Publication Data

US 2021/0299489 A1 Sep. 30, 2021

Related U.S. Application Data

(60) Provisional application No. 63/000,027, filed on Mar. 26, 2020, provisional application No. 63/081,626, filed on Sep. 22, 2020.

(51) Int. Cl.
*A62B 23/02* (2006.01)
*A41D 13/11* (2006.01)
(Continued)

(52) U.S. Cl.
CPC ........ *A62B 23/025* (2013.01); *A41D 13/1192* (2013.01); *A61M 21/02* (2013.01);
(Continued)

(58) Field of Classification Search
CPC ......... A62B 23/025; A62B 7/10; A62B 23/02; A41D 13/11–1192; B01D 39/1623;
(Continued)

(56) References Cited

U.S. PATENT DOCUMENTS 3,249,108 A * 5/1966 Terman .................... A61F 7/007
D24/110.4
3,521,630 A * 7/1970 Westberg ............. A62B 23/025
55/528
(Continued)

FOREIGN PATENT DOCUMENTS

CN 105795550 A * 7/2016
CN 108992820 A * 12/2018 ........... A62B 23/025
(Continued)

OTHER PUBLICATIONS

Egnlish translation for KR 20160009335, machine translated by Espacenet.com, translated on Oct. 28, 2024.*
(Continued)

*Primary Examiner* — Tu A Vo
(74) *Attorney, Agent, or Firm* — Dickinson Wright PLLC

(57) ABSTRACT

A filter which includes a layer of non-woven material infused with or containing particles of pharmaceutical salt and optionally essential oil for use in a face mask, is provided. The particles can be infused by a halogenerator. The filter can be placed in a pocket on an exterior side of a facial section, or otherwise attached to the facial section of the face mask. The salt filter deactivates the virus or other pathogen and thus effectively limits the transmission of viruses and other pathogens to and from a person wearing the face mask. The facial section can be formed of a mesh material. The face mask, including the salt filter, is preferably breathable, and light-weight, reusable.

12 Claims, 6 Drawing Sheets

(51) Int. Cl.
*A61M 21/00* (2006.01)
*A61M 21/02* (2006.01)
*A62B 7/10* (2006.01)
*B01D 39/16* (2006.01)

(52) U.S. Cl.
CPC ............ *A62B 7/10* (2013.01); *B01D 39/1623* (2013.01); *A61M 2021/0016* (2013.01); *B01D 2239/0407* (2013.01); *B01D 2239/0442* (2013.01); *B01D 2239/045* (2013.01); *B01D 2239/0618* (2013.01); *B01D 2239/065* (2013.01); *B01D 2239/10* (2013.01); *B01D 2239/1216* (2013.01); *B01D 2239/1241* (2013.01)

(58) Field of Classification Search
CPC .... B01D 2239/0407; B01D 2239/0442; B01D 2239/045; B01D 2239/0618; B01D 2239/065; B01D 2239/10; B01D 2239/1216; B01D 2239/1241; B01D 2239/0464; B01D 2239/0492; B01D 2239/0622; B01D 2239/0627; B01D 2239/0668; B01D 2239/0681; B01D 39/083; B01D 39/1676; B01D 2239/0258; A61M 2021/0016
See application file for complete search history.

(56) References Cited

U.S. PATENT DOCUMENTS

| | | | | |
|---|---|---|---|---|
| 4,628,927 | A * | 12/1986 | Ward | A41D 13/1146 128/206.17 |
| 5,561,863 | A * | 10/1996 | Carlson, II | A41D 13/1115 2/206 |
| 11,052,269 | B1 * | 7/2021 | Greenway, II | B01D 39/1623 |
| 11,577,102 | B2 * | 2/2023 | Seela | A62B 18/025 |
| 2004/0000313 | A1 * | 1/2004 | Gaynor | B01D 39/1623 128/205.27 |
| 2004/0091556 | A1 * | 5/2004 | Tigunait | A61K 36/28 128/898 |
| 2005/0079379 | A1 * | 4/2005 | Wadsworth | D04H 1/43838 428/684 |
| 2005/0172968 | A1 * | 8/2005 | Hishida | A62B 23/025 128/205.25 |
| 2005/0183727 | A1 * | 8/2005 | Chou | A41D 13/1192 128/205.25 |
| 2008/0110469 | A1 * | 5/2008 | Weinberg | A41D 13/1176 128/206.25 |
| 2009/0114228 | A1 * | 5/2009 | Kirschner | A01M 31/008 128/206.13 |
| 2009/0260635 | A1 * | 10/2009 | Dean | A41D 13/11 128/863 |
| 2009/0320849 | A1 | 12/2009 | Biederman | |
| 2011/0023431 | A1 | 2/2011 | Marcoon | |
| 2012/0111344 | A1 * | 5/2012 | Goranov | A41D 13/1115 29/428 |
| 2015/0059771 | A1 * | 3/2015 | Duffy | A41D 13/1161 29/896.62 |
| 2015/0173436 | A1 * | 6/2015 | Tsuei | A41D 13/1115 2/424 |
| 2015/0216241 | A1 * | 8/2015 | Lee | A41D 13/1192 128/863 |
| 2016/0213959 | A1 * | 7/2016 | Barklow | A41D 13/1107 |
| 2016/0316831 | A1 * | 11/2016 | Yarahmadi | A41D 23/00 |
| 2020/0179547 | A1 * | 6/2020 | Choi | A41D 13/1192 |
| 2021/0345708 | A1 * | 11/2021 | Mousa | A62B 23/025 |

FOREIGN PATENT DOCUMENTS

| | | | | |
|---|---|---|---|---|
| CN | 111317201 | A * | 6/2020 | ......... A41D 13/1192 |
| JP | 3150869 | U * | 6/2009 | |
| KR | 101564656 | B1 * | 10/2015 | |
| KR | 20160009335 | A * | 1/2016 | |
| KR | 20200030332 | A * | 3/2020 | |
| TW | M527334 | U * | 8/2016 | |
| WO | 2018033793 | A1 | 2/2018 | |

OTHER PUBLICATIONS

English translation for JP 3150869, machine translated by Espacenet.com, translated on Oct. 28, 2024.*
English translation for CN 105795550, machine translated by Espacenet.com, translated on Oct. 28, 2024.*
English translation for KR 20200030332, machine translated by Espacenet.com, translated on Oct. 28, 2024.*
English translation for CN 108992820, machine translated by Espacenet.com, translated on Oct. 30, 2024.*
Egnlish translation of claims for KR 20160009335, machine translated by Espacenet.com, translated on Oct. 30, 2024.*
Profi Sonic retrieved Mar. 26, 2021. Retrieved from internet: https://halogenerators-saltrooms-inhalators-for.eu/inhalators/professional-inhalator-profi-sonic/.
Coolibar UPF 50+ Men's Women's Blackburn UV Mask—Sun Protective Date first available: May 2, 2016. Retrieved Mar. 26, 2021. Retrieved from internet: https://www.amazon.com/Coolibar-UPF-Unisex-Mask-Protective/dp/B01F2INZAG.
A biomedical engineer created a mask coated in salt that he says could neutralize viruses like the coronavirus in 5 minutes Secon. Published Apr. 8, 2020. Retrieved Mar. 26, 2021. Retrieved from internet: https://www.businessinsider.com/mask-coated-in-salt-neutralizes-viruses-like-coronavirus-2020-2.
Homemade Masks in a Time of Shortage Lin. Published Mar. 18, 2020. Retrieved Mar. 26, 2021. Retrieved from Internet: https://hackaday.com/2020/03/18/homemade-masks-in-a-time-of-shortage/.
Universal and reusable virus deactivation system for respiratory protection Quan et al. Published Jan. 4, 2017. Retrieved Mar. 26, 2021. Retrieved from internet: https://www.nature.com/articles/srep39956.
Essential Oils as Antimicrobial Agents-Myth or Real Alternative? Winska et al. Published Jun. 5, 2019. Retrieved Mar. 26, 2021. Retrieved from internet: https://www.ncbi.nlm.nih.gov/pmc/articles/PMC6612361/.
Coronavirus and Salt Therapy—What You Need To Know Tonkin. Published Mar. 6, 2020. Retrieved Mar. 26, 2021. Retrieved from internet: https://www.saltchamberinc.com/coronavirus-and-salt-therapy/.
How The Salt Room Appleton Can Help Your Asthma Retrieved Mar. 26, 2021. Retrieved from internet: http://www.saltroomappleton.com/Appleton/Symptoms/Asthma/salt-therapy/Salt-Room.aspx.
New surgical mask doesn't just trap viruses, it renders them harmless Published Jan. 5, 2017. Retrieved Mar. 26, 2021. Retrieved from internet: https://www.sciencedaily.com/releases/2017/01/170105160228.htm.
Bulk 22 lb (10kg) Pharmaceutical Grade Salt Approved for Halogenerators—Use in Salt Therapy Rooms and Salt Caves (Pack of 4) Retrieved Mar. 26, 2021. Retrieved from internet: https://www.walmart.com/ip/BULK-22-lb-10kg-Pharmaceutical-Grade-Salt-Approved-for-Halogenerators-Use-in-Salt-Therapy-Rooms-and-Salt-Caves-Pack-of-4/933735685.
Make your own DIY Enhanced Face Mask with truSÈNSSE Eucalyptus Essential Oil Tupperware Brands Malaysia. Retrieved Mar. 26, 2021. Retrieved from internet: https://www.youtube.com/watch?v=c5KYJtx6rQQ.
3 Fabrics That Can Be Used To Make A Face Mask Published Feb. 17, 2020. Retrieved Mar. 26, 2021. Retrieved from internet: https://www.wazoodle.com/blog/face-mask-fabrics.

* cited by examiner

FIG. 3
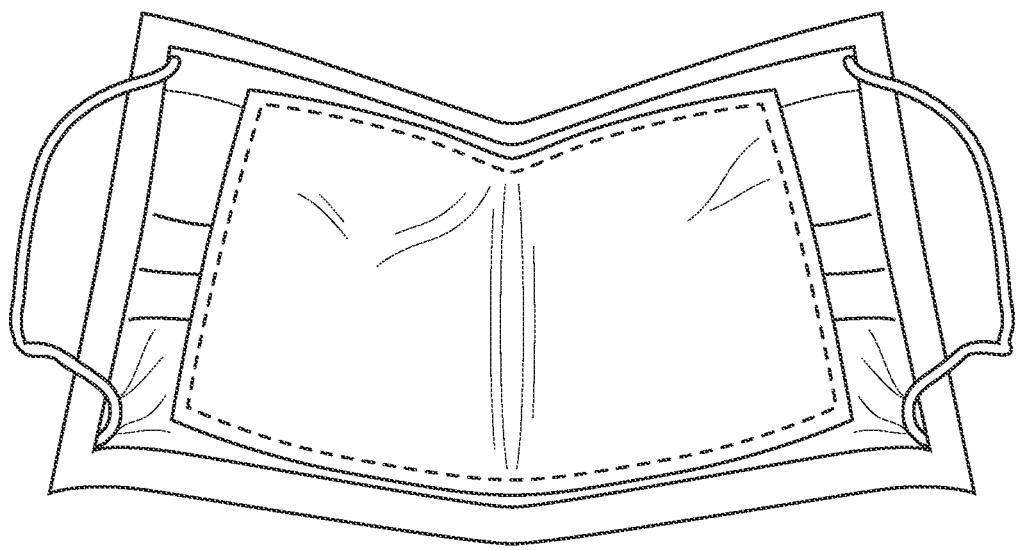
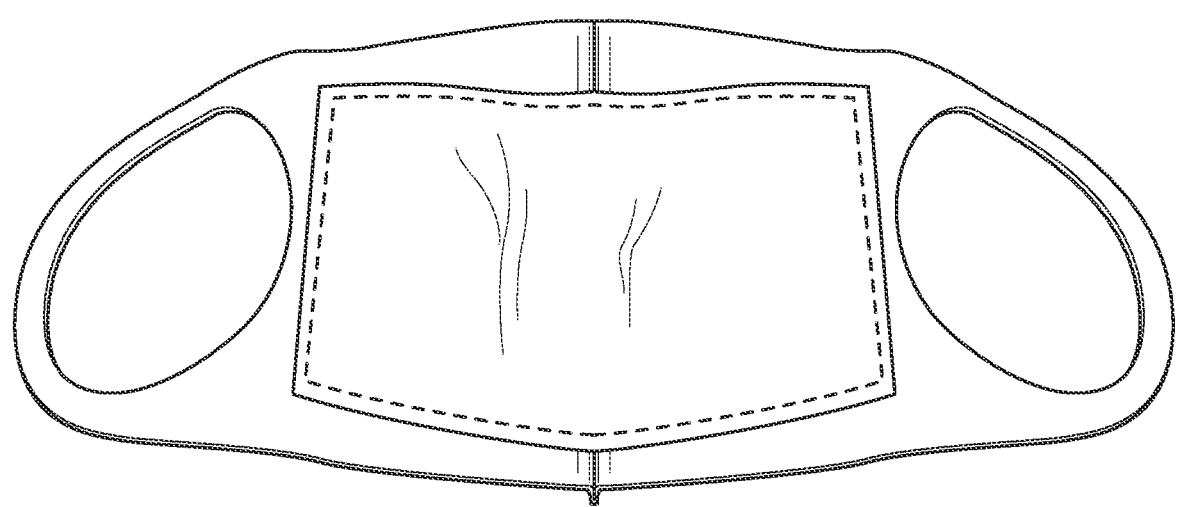
FIG. 4

FILTER CONTAINING PHARMACEUTICAL SALT FOR A FACE MASK, BREATHABLE FACE MASK CONTAINING THE FILTER, AND METHOD OF MANUFACTURING

This U.S. utility patent application claims priority to U.S. provisional patent application No. 63/000,027, filed Mar. 26, 2020, and U.S. provisional patent application No. 63/081,626, filed Sep. 22, 2020, the entire contents of which are incorporated herein by reference.

BACKGROUND OF THE INVENTION

1. Field of the Invention

This invention relates to a filter for a face mask, a face mask including a filter, and methods of manufacturing the filter and face mask.

2. Related Art

Viruses and other pathogens travel and spread through the air; in droplets, such as saliva or phlegm from coughing, sneezing, speaking, or breathing; and on surfaces. Face masks are often used in attempt to prevent transmission of the viruses and other pathogens from one infected person to another. However, conventional surgical face masks are not sufficient in some cases. For example, droplets carrying the virus or other pathogen, such as droplets expelled from coughing, sneezing, speaking, or breathing, can stay on the surface of a conventional mask. Conventional masks do not kill the virus on the surface. Thus, the virus could be transmitted upon contact with the mask. In addition, conventional face masks, although marketed as "breathable", are difficult to wear for long periods of time and while engaging in physical activities, such as sports.

Air filtering devices, such as N95 respirators, are also used to reduce infection risk associated with respiratory viruses. However, N95 respirators may not be adequate in providing sufficient protection against some airborne pathogens. Many factors are involved in affecting the efficacy of a filter. The first being that the filter may not sufficiently filter out some smaller size airborne particles and pathogens, providing limited protection against these airborne pathogens. For example, as explained by Hyo-Jick Choi, National Institute for Occupational Safety and Health (NIOSH)-certified N95 respirators cannot provide an expected level of protection against 40-50 nm infectious particles including aerosols. Additionally, the efficacy of the filter that may be used in a mask is also dependent upon on how well the mask or shield fits the face. The mask must fit properly to avoid exposure of airborne pathogens from entering the sides of the mask or shield. Adequate training by a professional must take place on how to properly use an N95 mask, and this requirement may limit public use. In addition, the N95 respirators may be difficult to wear for long periods of time of while engaging in activities.

Face masks coated in salt have also been developed in attempt to prevent transmission of viruses on the surface of face masks. See, for example: https://www.businessinsider.com/mask-coated-in-salt-neutralizes-viruses-like-coronavirus-2020-2. As described by Hyo-Jick Choi in this article, when a virus-carrying droplet encounters a mask coated in a salt solution, the droplet absorbs the salt. Once the liquid of the droplet evaporates, all that remains is the virus and crystallized salt which slices through the virus, neutralizing it. This process completes in about the amount of time it takes the water to evaporate.

However, there remains a great need for additional and/or improved methods to limit the transmission of viruses and pathogens. More specifically, there is a need for sustainable, re-usable, and breathable face masks.

SUMMARY

One aspect of the invention provides a method for making a face mask that not only effectively limits the transmission of viruses and pathogens, but is sustainable, re-usable, light-weight, and more breathable than the prior art face masks. The face mask of the present invention is desirable to individuals engaging in activities which require a face mask for extended periods of time, for example athletes.

According to one embodiment, the method of making the face mask includes infusing particles of 99.99% pure sodium chloride into a filter layer formed of a first material. The infusing step is conducted by a halogenerator. The method further includes disposing the filter layer infused with the particles along a facial section formed of a second material.

According to another embodiment, the method of making the face mask includes bathing a filter layer formed of a first material in a liquid containing particles of 99.99% pure sodium chloride. The method further includes disposing the filter layer containing the particles along a facial section formed of a second material.

Another aspect of the invention provides a method of making a filter for a face mask. The method comprises infusing particles of 99.99% pure sodium chloride into a filter layer formed of a first material. The infusing step is conducted by a halogenerator.

Yet another aspect of the invention provides a face mask including a filter layer and a facial section. The filter layer is formed of a first material and contains particles of 99.99% pure sodium chloride, and the facial section is formed of a second material. The filter layer is disposed along the facial section of the face mask.

Yet another aspect of the invention provides a filter for a face mask. The filter includes a filter layer formed of a first material and containing particles of 99.99% pure sodium chloride.

BRIEF DESCRIPTION OF THE DRAWINGS

Advantages of the present invention will be readily appreciated, as the same becomes better understood by reference to the following detailed description when considered in connection with the accompanying drawings.

FIGS. 3 and 4 illustrate face masks including the filter layer according to other example embodiments.

DETAILED DESCRIPTION OF EXAMPLE EMBODIMENTS

Figure 1:
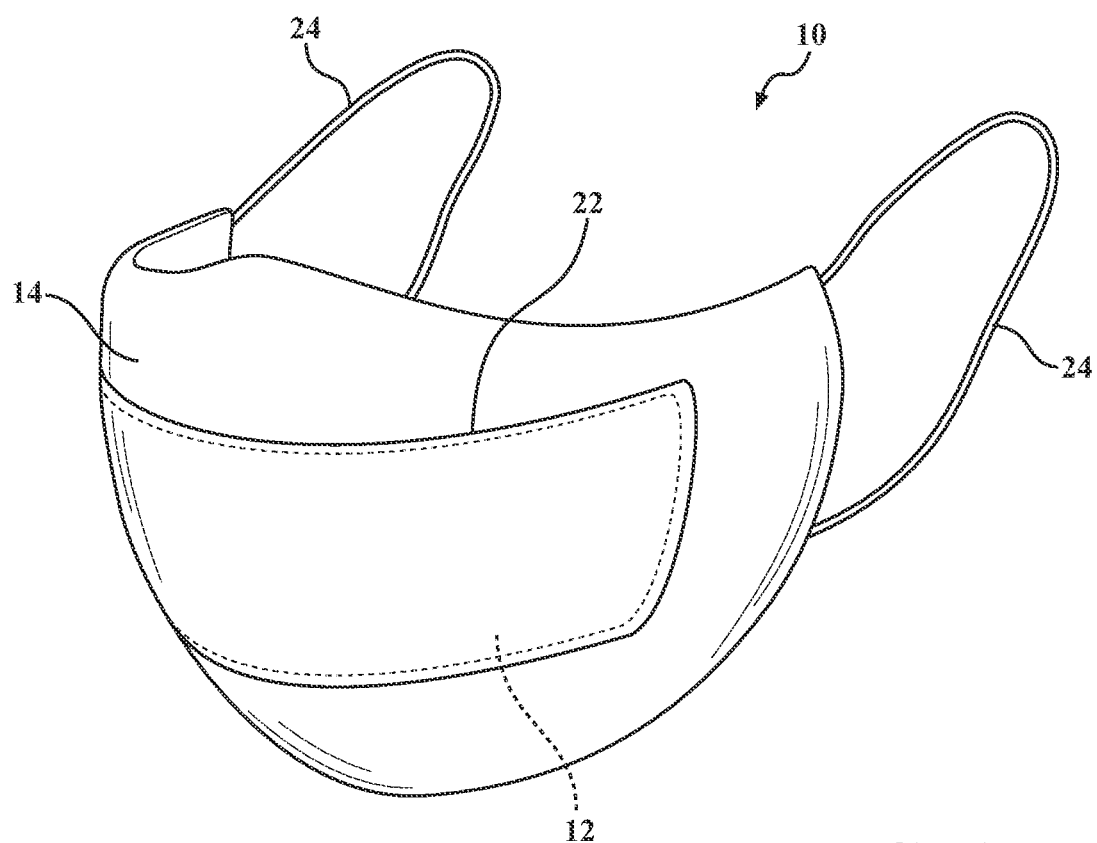
FIG. 1 illustrates a face mask including a filter layer infused with particles of 99.99% pure sodium chloride in a pocket on an exterior side of a facial section according to an example embodiment.

One aspect of the invention provides a method of making a face mask 10 which effectively limits the transmission of viruses and other pathogens, and which is also re-usable, light-weight, and more breathable than the prior art face masks. Due to these characteristics, individuals engaging in physical activities will find the face mask 10 made according to embodiments of the invention desirable to wear for extended periods of time. An example of the face mask 10 is shown in FIG. 1.

The face mask 10 includes a filter layer 12 attached to a facial section 14. The filter layer 12 is formed of a first material, which is preferably a non-woven material but may be a woven material. Examples of non-woven materials include SMS spunbonded non-wovens, Grade 95 meltblown cloth, or activated carbon material. The first material could also be a high efficiency particulate air (HEPA) filter or cotton.

Figure 2:
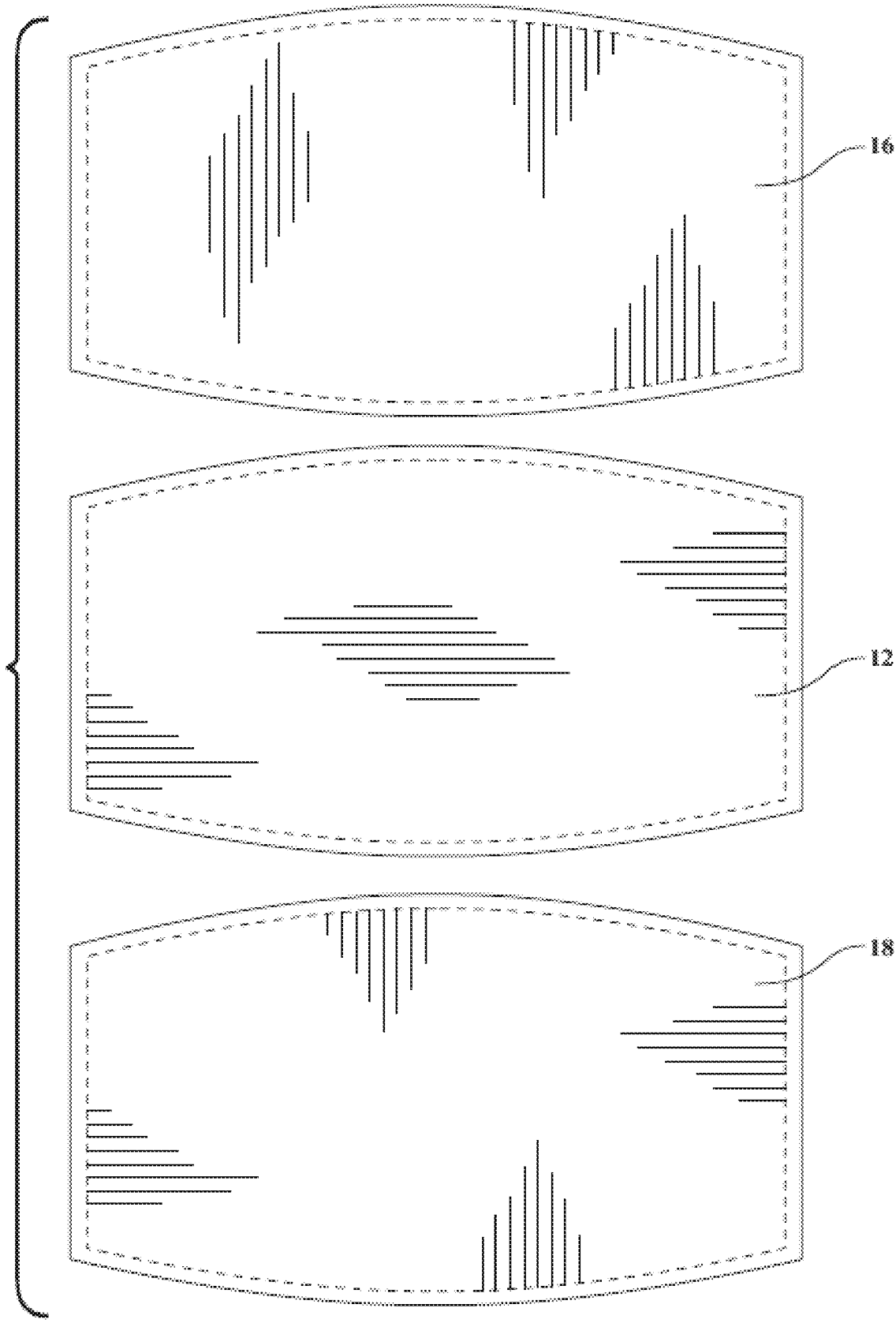
FIG. 2 illustrates the filter layer infused with particles of 99.99% pure sodium chloride, an inner layer, and an outer layer which can be attached together to form a filter for a face mask according to an example embodiment.
Figure 5:
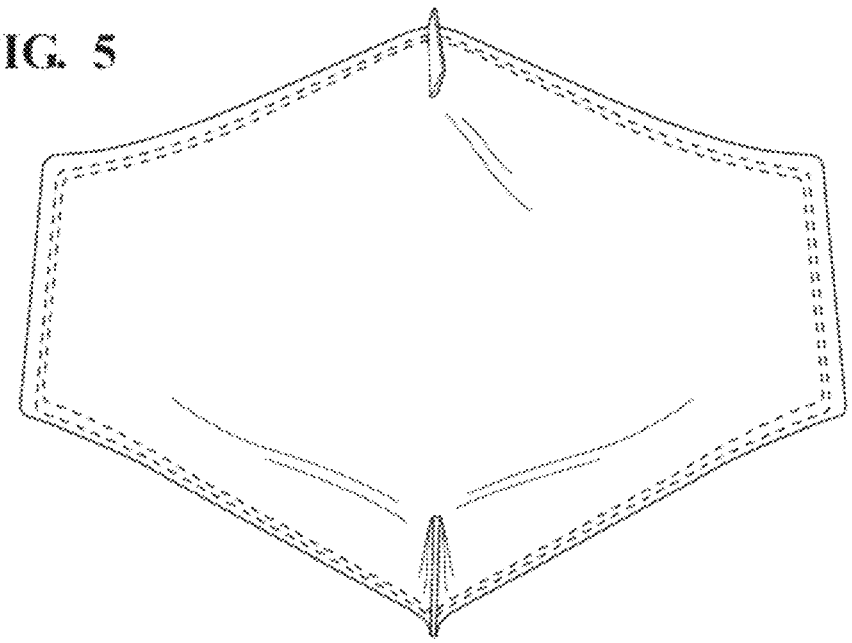
FIG. 5 illustrates the filter layer infused with particles of 99.99% pure sodium chloride according to another example embodiment.
Figure 6:
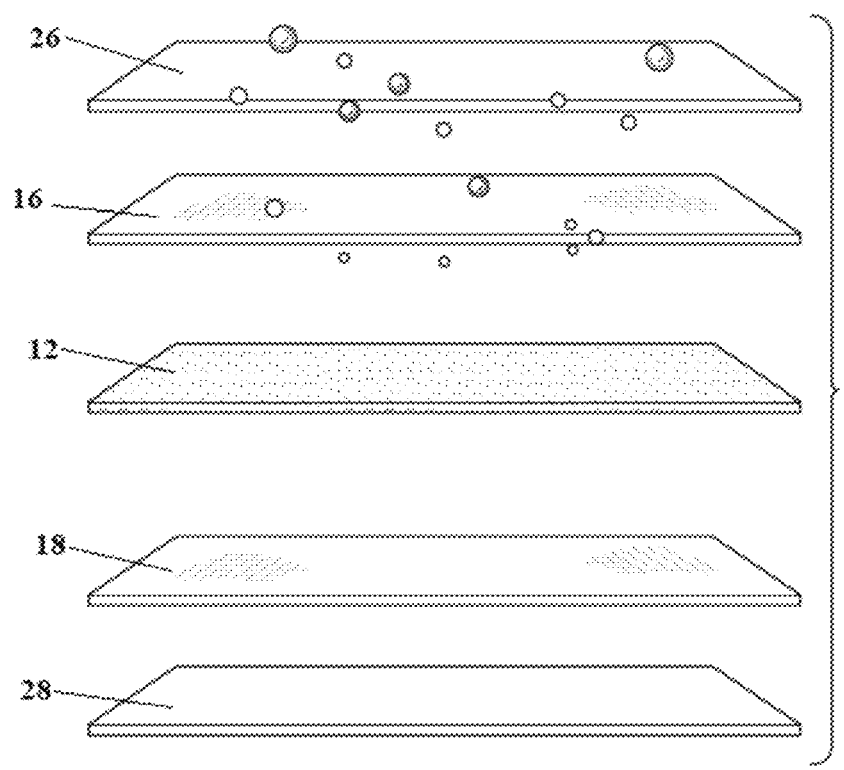
FIG. 6 illustrates a variety of materials that can be used to form the layers of the filter for the face mask.

The filter layer 12 can be used on its own, but typically, the filter layer 12 is used with at least one additional layer, preferably three or more layers, more preferably three to five layers. For example, an inner layer 16 formed of an inner material, and an outer layer 18 formed of an outer material can be attached to opposite sides of the filter layer 12 to form a filter. An example of the three layers 12, 16, 18 is shown in FIG. 2. The inner and outer materials can be non-woven, such as SMS spunbonded non-wovens, Grade 95 meltblown filter cloth, or activated carbon material, high efficiency particulate air (HEPA) filter, or woven. The material can be anti-sticking. FIGS. 3 and 4 illustrate the face mask 10 with the filter layer 12 attached to additional layers according to other example embodiments. According to these embodiments, the filter layer 12 has a size of 4.7 inch×3.1 inch (+/−2 inches). FIG. 5 illustrates the filter layer 12 attached to additional layers according to another example embodiment. According to this embodiment, the filter layer 12 is 4.8 inches (+/−1 inch)×3.86 inches (+/−1 inch). FIG. 6 illustrates the filter layer 12 formed of a carbon material and located between two layers formed of Grade 95 meltblown cloth 16, 18. Also in FIG. 6, two layers of the SMS spunbonded non-wovens 26, 28 are disposed on opposite sides of the Grade 95 meltblown cloth 16, 18 (one SMS spunbonded non-woven 26 outward of one Grade 95 meltblown cloth 16, and another SMS spunbonded non-woven 28 outward of the other Grade 95 meltblown cloth 18).

The step of making the filter layer 12 includes infusing particles of at least 99.99% pure sodium chloride (pharmaceutical salt) into the first material. The particles could be 100% pure sodium chloride. The at least 99.99% pure sodium chloride is antimicrobial, antibacterial, and antiviral.

Figure 7:
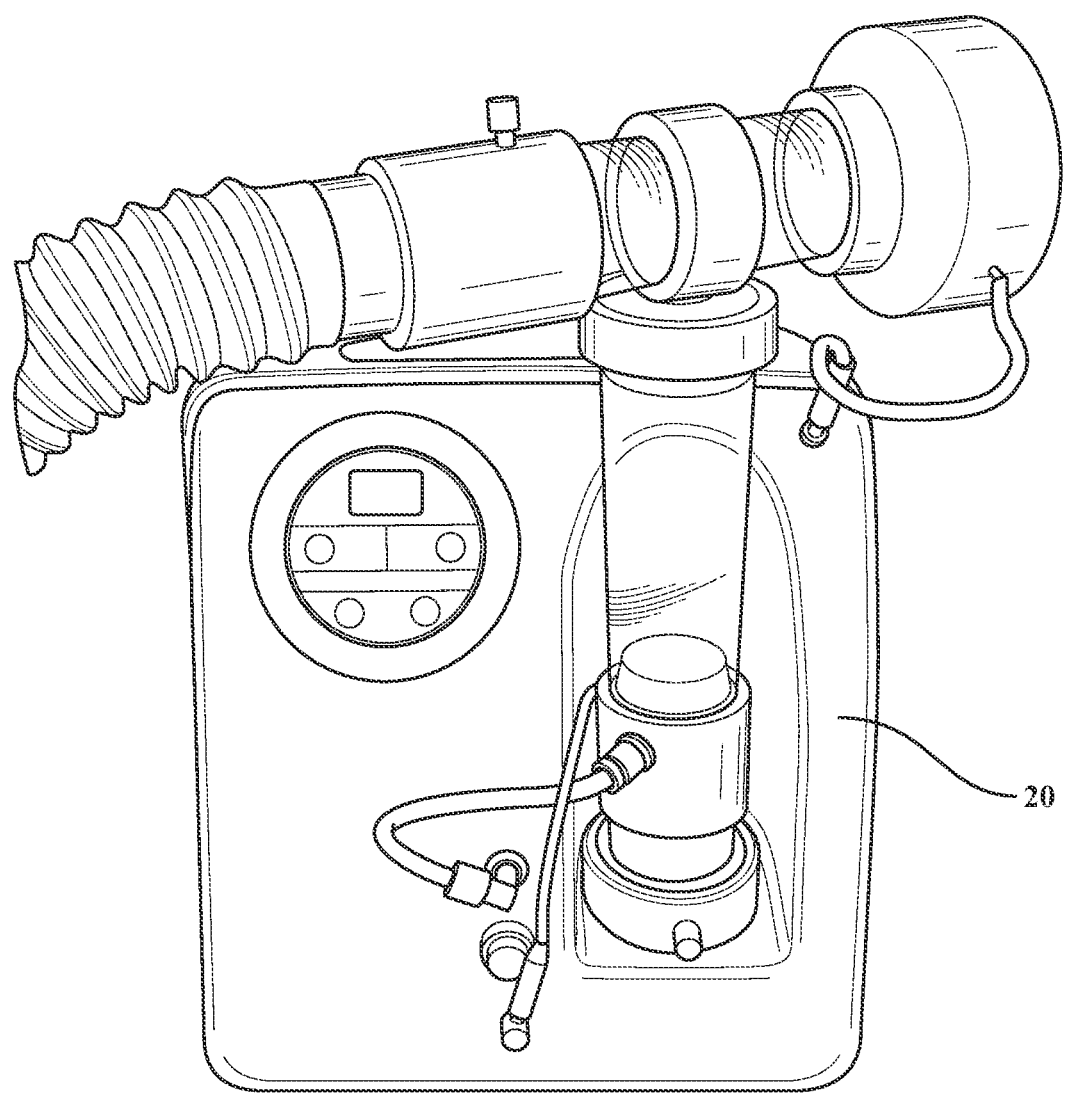
FIGS. 7 and 8 show examples of a halogenerator used to form the filter layer infused with particles of 99.99% pure sodium chloride according to example embodiments.
Figure 8:
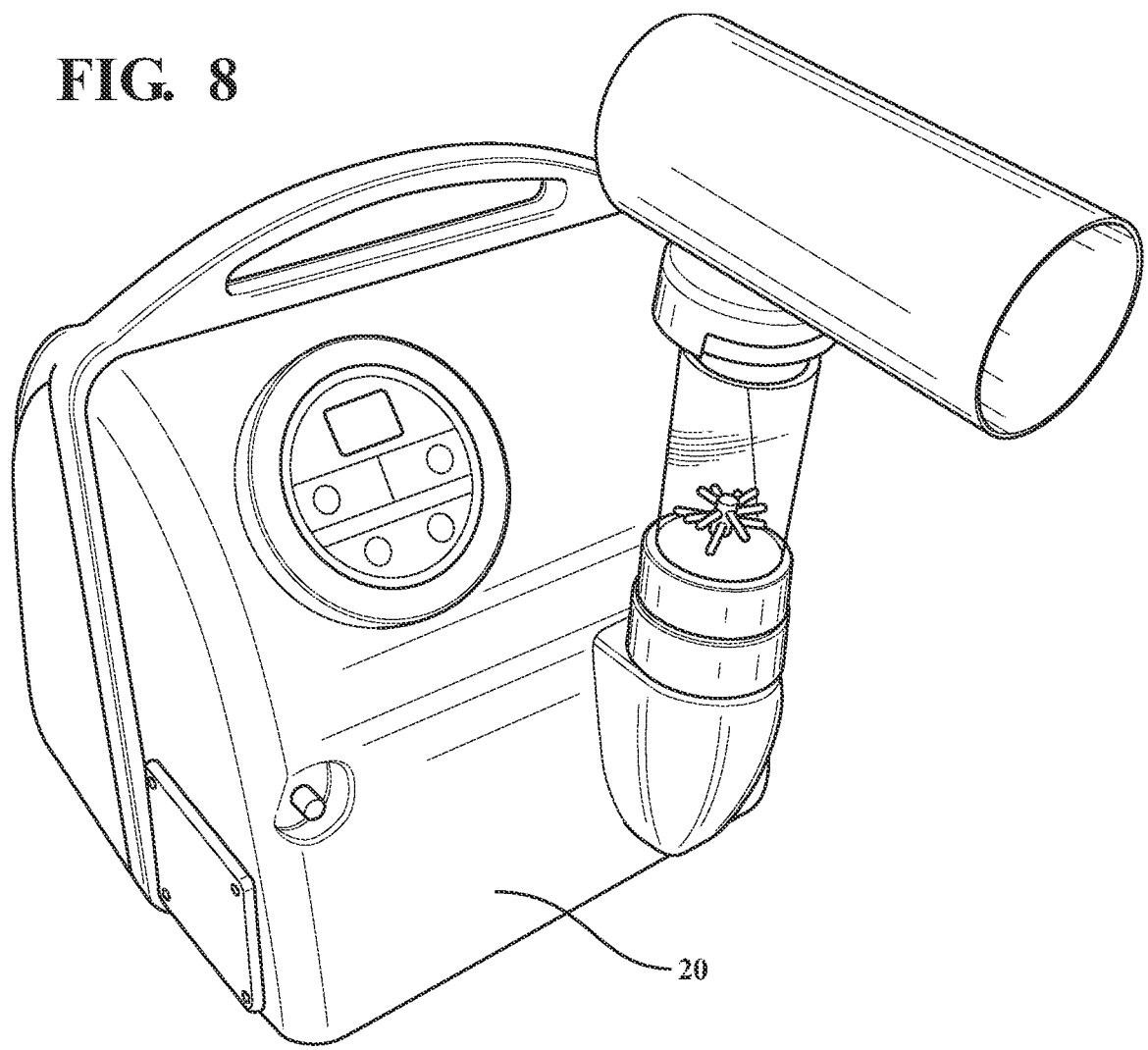

The infusing step is typically conducted by a halogenerator 20 which grinds salt to form the particles and blows the particles of pharmaceutical salt into the filter layer 12. More specifically, halotherapy includes heating and crushing the pharmaceutical salt into very tiny micro-particles by a halogenerator creating aerosolization salt. These dry aerosol micro-particles are then blown into the material where they become trapped in the filter fibers. Common standards require that a HEPA air filter must remove—from the air that passes through—at least 99.95% (European Standard)[4] or 99.97% (ASME, U.S. DOE)[5][6] of particles whose diameter is equal to 0.3 µm; with the filtration efficiency increasing for particle diameters both less than and greater than 0.3 µm. Halotherapy will mill and aerosolize the salt particles down to 0.3 to 0.9 microns in diameter, making them small enough to saturate the material of the filter and cover the surface area of the fibers so that when airborne pathogens become trapped in the filter's fibers the salt will absorb the respirated moist air then recrystallize into sharp crystals that will destroy or decode the virus preventing the virus from invading the respiratory tract. The majority of the aerosolization salt particles typically have a diameter of 0.3 to 0.5 microns. The particles of at least 99.99% pure sodium chloride are infused in the non-woven or woven fibers of the filter layer 12. An example of the halogenerator 20 is shown in FIGS. 7 and 8, although larger versions could be developed to scale.

According to one embodiment, the method also includes infusing particles of food grade essential oil into the filter layer 12 along with the at least 99.99% pure sodium chloride particles. In this case, the essential oil can be mixed with the ground particles in the halogenerator 20, and the halogenerator 20 blows both the at least 99.99% pure sodium chloride particles and the essential oil particles into the filter layer 12.

According to one embodiment, a mixture including the pharmaceutical salt, optionally essential oil(s), and optionally other ingredients are infused into the filter layer 12 using the halogenerator 20. The essential oil is a single oil or a blend of oils. The essential oil(s) can include Eucalyptus, Lavender, Tea-tree, Chamomile, Peppermint, Frankincense and/or Vanilla. According to one embodiment, the essential oils include Eucalyptol (high pressure crystalized), Cineole, Mint (crystallized), and Camphor (steam chamber purified and low temperature crystalized).

According to another example embodiment, the filter layer 12 is dipped in a salt bath containing a liquid and a concentration of pharmaceutical salt. This would coat the entire surface area of the first material and all of the fibers.

Once the filter layer 12 containing or infused with the particles of 99.99% pure sodium chloride and optionally the essential oil, the filter layer 12 can be disposed along the facial section 14 of the face mask 10. Typically, the filter includes three layers, so the inner layer 16 is attached to an inner side of the filter layer 12 and the outer layer 18 is attached to an outer side of the filter layer 12. The inner and outer layers 16, 18 can be attached by binding, stamping, sewing, adhesive, or another method.

The filter layer 12 alone or preferably the attached inner, outer, and filter layers 12, 16, 18 together form the filter and are next attached or coupled to the facial section 14 to form the face mask 12. The facial section 14 is designed to cover a human mouth and nose. For example, the dimensions of the facial section 14 could be approximately 8.5 inches in height×20.5 inches in width, but the height and/or the width could vary by +/−2 inches.

The facial section 14 can be formed of any type of material. However, according to preferred embodiments, the facial section 14 is formed of a highly breathable material, for example a mesh or muslin material. The mesh material can be formed of nylon and/or polyester, and includes openings which are visible to the naked eye. For example, the openings can range from 0.1 to 5 mm in diameter, length, and/or width. Forming the facial section 14 from mesh provides for the high breathability, which is especially desirable for individuals participating in physical activities, such as athletes, and wearing the face mask 10 for long periods of time. The prior art face masks which are capable of preventing the transmission of a virus and pathogens are typically formed of a thick cloth fabric and not highly breathable. Such masks do not include openings ranging in size from 0.1 to 5 mm in diameter, length, and/or width, like the mesh facial section. Alternatively, the facial section 14 could be formed of cloth or another fabric. The facial section 14 can also include a patter and/or UV protection.

According to a preferred embodiment, the facial section 14 of the face mask 10 includes a pocket 22, and the filter layer 12 is disposed in the pocket 22. The pocket 22 is typically located on an exterior side of the facial section 14, which is designed to face away from a human nose and mouth. The pocket 22 could also be located in the interior side of the facial section 14. According to another embodiment, the facial section 14 includes two layers of the mesh or other material, and the filter layer 12 is disposed between the two layers. Alternatively, the filter layer 12 could be coupled to the facial section 14 by fasteners, Velcro, adhesive, or another method.

The face mask 10 typically includes straps 24 attached to the facial section 14 for securing the facial section 14 to a human head. For example, the face mask 10 could include a pair of straps 24 extending from side edges of the facial section 14 and extending around the ears or around the entire head. Alternatively, the facial section 14 could be provided in the form of a neck gaiter or another style.

As indicated above, the face mask 10 formed according to the present invention is light in weight, such that an individual wearing the face mask 10 barely feels its presence. In addition, the filter layer 12 provides two-way protection. The pharmaceutical salt in the filter layer 12 prevents the virus or other pathogen from traveling from another person to the individual wearing the mask 10, and it prevents the virus or other pathogen from traveling away from the individual wearing the mask. More specifically, when a virus-carrying droplet encounters the filter layer 12, it starts to absorb the salt, and once the droplets evaporate, all that remains is the virus. The crystallized salt pierces and slices through the virus, neutralizing, deactivating, and decoding it. The process takes about as long as it takes the water droplets to evaporate, very little time. The filter layer 12 will last about 30 days before needing to be replaced with a new one, and the replacement is quick and inexpensive. The facial section 14 of the face mask can be washed and reused.

Obviously, many modifications and variations of the present invention are possible in light of the above teachings and may be practiced otherwise than as specifically described while within the scope of the invention.

The invention claimed is:

1. A face mask, comprising:
a filter layer formed of a carbon material and containing fibers and particles of at least 99.99% pure sodium chloride, the particles having a diameter ranging from 0.3 to 0.5 microns,
the filter layer being located between two layers of meltblown cloth;
the filter layer and the two layers of meltblown cloth being located between two layers of SMS spunbonded non-woven material;
a facial section formed of a second material, and
the filter layer being disposed along the facial section.

2. The face mask of claim 1, wherein the facial section is formed of a mesh material.

3. The face mask of claim 1, wherein the facial section includes a pocket, and the filter layer, the layers of meltblown cloth, and the layers of SMS spunbonded non-woven material are disposed in the pocket.

4. The face mask of claim 1, wherein
the filter layer includes essential oil,
the facial section is a mesh material formed of nylon and/or polyester,
the facial section includes openings ranging from 0.1 to 5 mm,
the facial section is designed to cover a human nose and mouth,
the facial section includes a pocket on an exterior side,
the filter layer, the layers of meltblown cloth, and the layers of SMS spunbonded non-woven material are disposed in the pocket, and
straps are attached to the facial section for securing the facial section to a human head.

5. The face mask of claim 1, wherein the particles are infused in the filter layer.

6. A filter, comprising:
a filter layer formed of a carbon material and containing fibers and particles of at least 99.99% pure sodium chloride, the particles having a diameter ranging from 0.3 to 0.5 microns,
the filter layer being located between two layers of meltblown cloth, and
the filter layer and the two layers of meltblown cloth being located between two layers of SMS spunbonded non-woven material.

7. The filter of claim 6, wherein the filter layer includes essential oil.

8. The filter of claim 7, wherein the essential oil includes at least one oil selected from the group consisting of Eucalyptus, Lavender, Tea-tree, Chamomile, Peppermint, Frankincense, Vanilla, Eucalyptol, Cineole, Mint, and Camphor.

9. The filter of claim 6, wherein the filter layer has a size of 4.7 inch±2 inches×3.1 inch±2 inches.

10. The filter of claim 6, wherein the filter layer has a size of 4.8 inches±1 inch×3.86 inches±1 inch.

11. The filter of claim 6, wherein the layers of meltblown cloth are attached by at at least one of: binding, a stamping, sewing, and an adhesive.

12. The filter of claim 6, wherein the particles are infused in the filter layer.

* * * * *